Dec. 30, 1924.  
C. O. BALL  
MOTOR VEHICLE  
Filed April 21, 1924  
1,521,064  
3 Sheets-Sheet 1
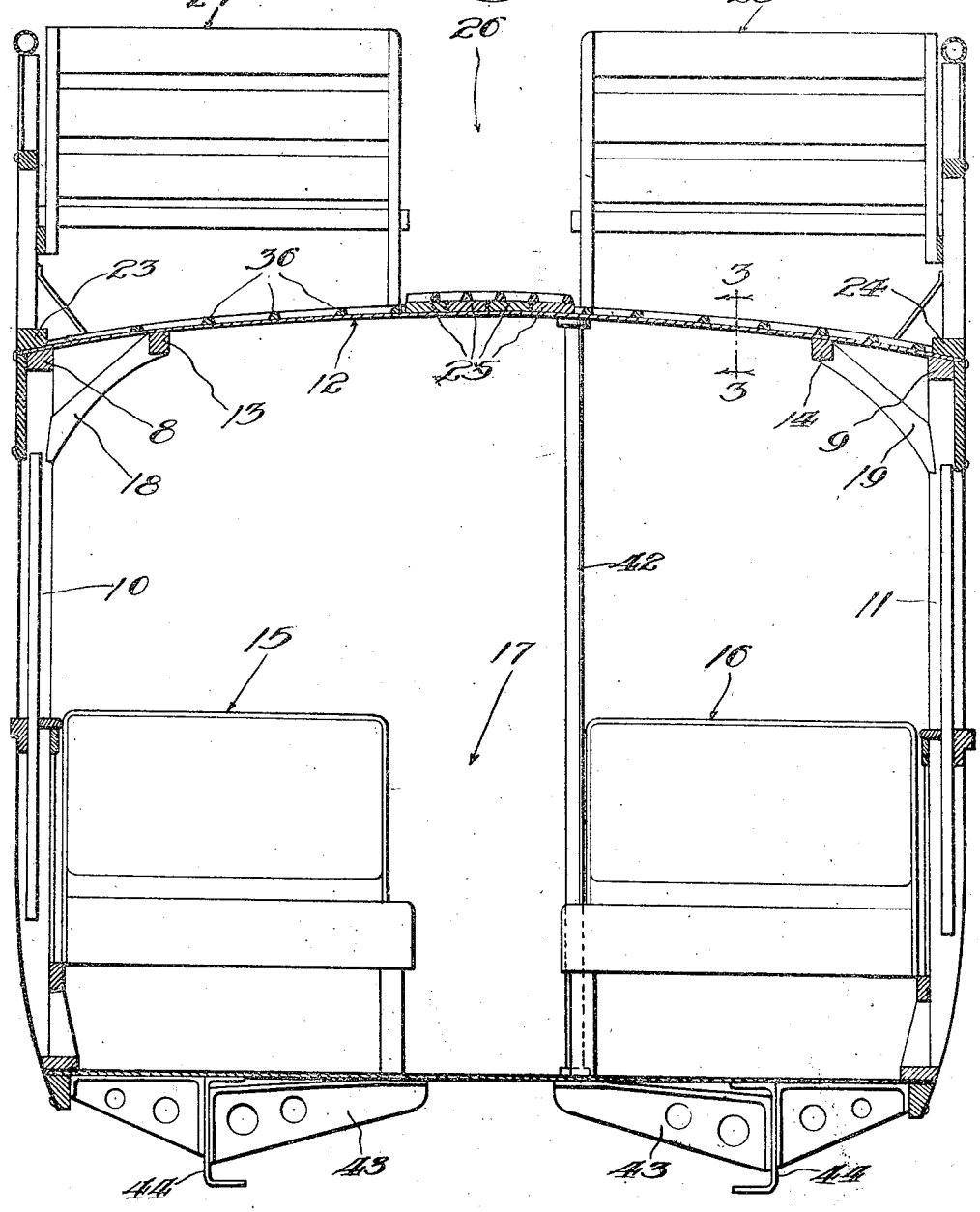
Inventor:
Charles O. Ball

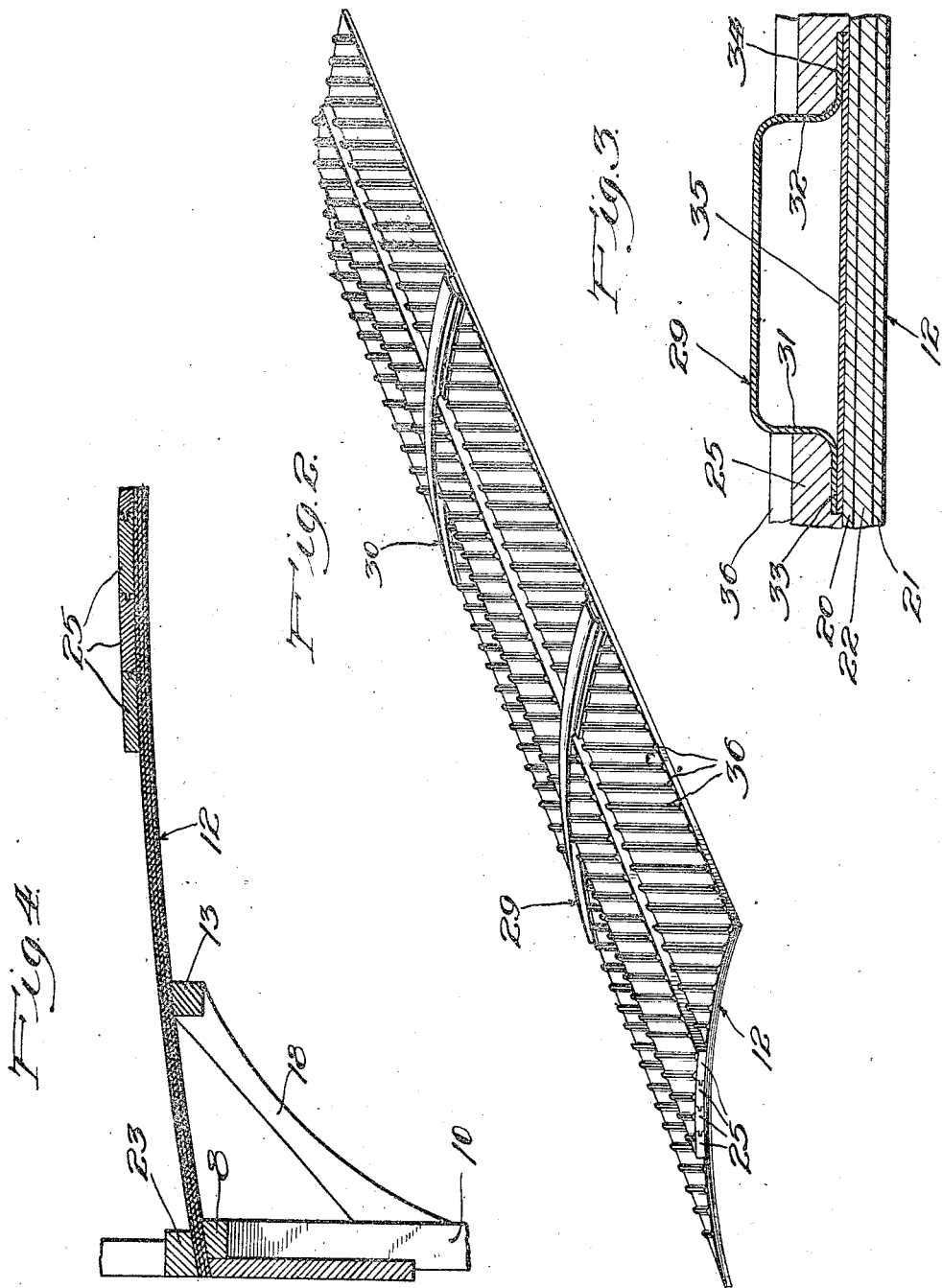

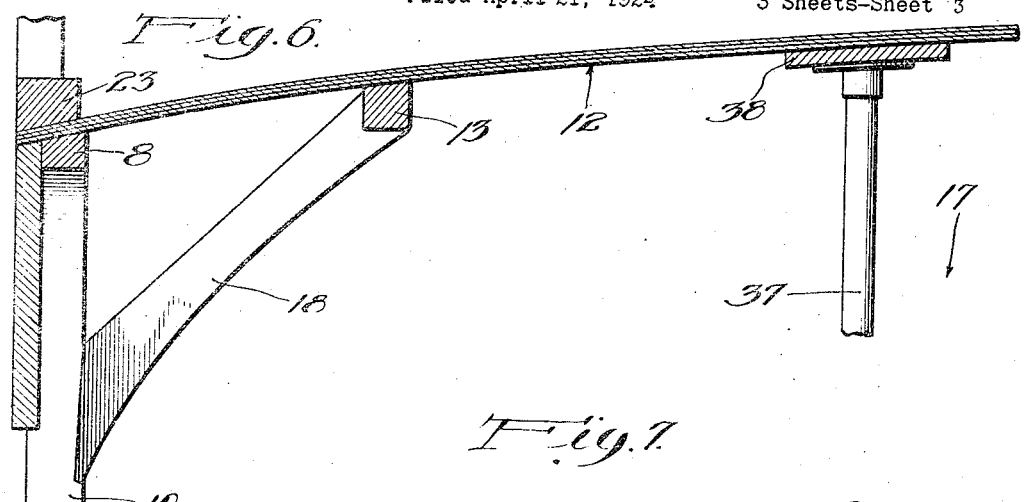
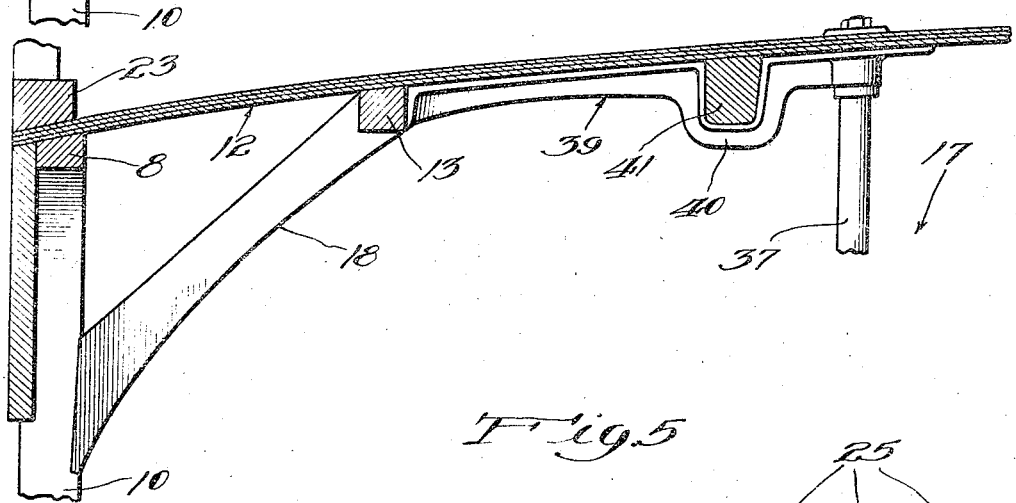
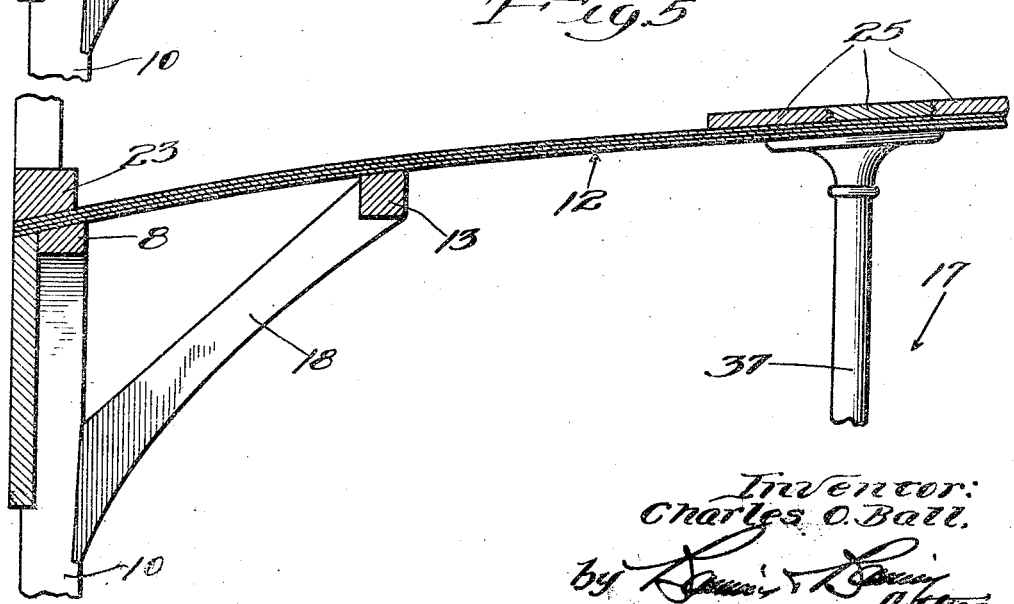

Patented Dec. 30, 1924.

1,521,064

UNITED STATES PATENT OFFICE.

CHARLES O. BALL, OF CHICAGO, ILLINOIS, ASSIGNOR TO YELLOW COACH MANUFACTURING COMPANY, OF CHICAGO, ILLINOIS, A CORPORATION OF ILLINOIS.

MOTOR VEHICLE.

Application filed April 21, 1924. Serial No. 707,872.

*To all whom it may concern:*

Be it known that I, CHARLES O. BALL, a citizen of the United States, residing at Chicago, in the county of Cook and State of Illinois, have invented certain new and useful Improvements in Motor Vehicles, of which the following is a specification.

This invention has to do with improvements in motor vehicles. It has to do particularly with improvements in the construction of the bodies of such motor vehicles as coaches, etc.

The invention has reference particularly to the construction of the roof portion of the vehicle. In this connection, it is noted that it is very desirable to be able to reduce the elevation of the roof of the vehicle as much as possible particularly in those cases where seats are provided on the upper deck.
In any case it is very desirable to be able to provide a roof construction for the interior of the vehicle which shall be free and clear of obstructions reaching down into the body of the vehicle. In other words, it is very desirable to provide a construction in which the roof shall present a practically clear and smooth surface to the interior, particularly above the center aisle.

In connection with the above it has generally been found necessary to provide some form of reinforcing members extending across the vehicle to reinforce the roof thereof, the same being termed carlines.

The main object of the present invention is to provide an improved roof construction of such a nature that these carlines may be eliminated either in whole or in part, and all obstruction removed from the lower surface of the roof, particularly above the center aisle.

Another object of the invention is to provide a construction such that if desired the obstructions may be removed not only above the center aisle, but also above a large portion of the seats so as to offer practically no obstruction to the passengers in entering and leaving the vehicle.

It is a further object to accomplish the above mentioned results in a structure possessing great strength and rigidity and amply able to carry the weight on the upper deck when fully loaded.

A further object of the invention is to provide a roof structure possessing the above mentioned advantages without increasing its thickness beyond what is found to be necessary as determined by other considerations.

A further object of the invention is to provide a structure in which the above strength and stiffness may be secured even when the stanchions are eliminated from the interior of the vehicle.

Other objects and uses of the invention will appear from a detailed description of the same, which consists in the features of construction and combinations of parts hereinafter described and claimed.

In the drawings:

Figure 1 shows a transverse section through a typical motor vehicle having a roof structure embodying the features of the present invention;

Fig. 2 shows a perspective view of the roof structure itself, the same being of the form shown in Fig. 1;

Fig. 3 shows a fragmentary longitudinal section through the roof of Figs. 1 and 2 on enlarged scale and may be considered as an enlarged section on line 3—3 of Fig. 1, looking in the direction of the arrows:

Fig. 4 shows a fragmentary cross section of a modified form of construction as compared to Figs. 1, 2 and 3;

Fig. 5 shows another modified form of construction similar to that of Fig. 4, with the exception that it illustrates how stanchions can be used along the center aisle, if desired;

Fig. 6 shows still another modification similar to that of Fig. 5, with the exception that the stanchions when used have a longitudinally extending beam associated with their upper ends; and Fig. 7 shows another modified form of construction in which the stanchions when used may have associated with them short transverse brackets reaching outwardly towards the longitudinal members at the sides of the vehicle, said brackets serving to support other longitudinal members.

In the construction of Figs. 1, 2 and 3, the side walls may be provided with longitudinally extending beams 8 and 9, along their upper edges; and may also be provided with the vertical posts 10 and 11 between the windows.

The roof 12, as illustrated in Figs. 1 and 2 in particular, is entirely free and clear of any downwardly depending portions throughout its entire width measured between the beams 13 and 14 which are relatively close to the beams 8 and 9 and are located well over the positions of the side seats 15 and 16. The aisle 17 between the side seats is in the center of the vehicle; and the beams 13 and 14 when used are placed well to the sides of the said aisle, so that persons moving back and forth along the aisle and entering and leaving the seats are in nowise discommoded by the presence of the beams 13 and 14.

The beams 13 and 14 when used are preferably reinforced and supported by brackets 18 and 19 which reach upwards from the side posts 10 and 11 at an angle of substantially 45°, as illustrated in Fig. 1.

The roof 12 is preferably arched somewhat, as illustrated in the figures, and reaches clear over the entire width of the vehicle between the side beams 8 and 9 and above the beams 13 and 14. The lower surface of this roof is placed at the lowest clearance which can be conveniently used, and owing to the fact that the bottom surface of the roof is entirely free and clear of obstructions, this elevation can be considerably reduced without inconvenience to the passengers.

The roof itself is preferably made of three ply veneer board or haskelite, as shown for example in Figs. 3, 4, 5, 6 and 7. When this material is used the top and bottom layers 20 and 21 respectively have their grain running in one direction, and the intermediate layer 22 has its grain running at right angles thereto. Furthermore, the top and bottom layers are preferably thinner than the middle layer, so that the strength is practically uniform in all directions.

The outer edges of this roof section are firmly reinforced and rigidly held in place by the top beams 23 and 24 which extend along the upper edge of the vehicle above the position of the beams 8 and 9. This support of the outer edges of the roof section together with the support afforded by the beams 13 and 14 establishes practically a compound cantilever for the central portion of the roof and thus affords great rigidity for the same.

Usually a number of longitudinally extending planks 25 are placed along the central portion of the upper deck so as to strengthen the floor of the center aisle 26 of the upper deck between the rows of seats 27 and 28 thereof. These planks 25 when used will further reinforce and stiffen the structure.

In some cases it will be desirable to use transverse beams 29 and 30 across the top of the roof, said beams when used being preferably made of sheet metal of channel cross section as illustrated in Fig. 3. The sides 31 and 32 of the channel sections are preferably flanged, as shown at 33 and 34, the flanges being in turn connected to a cross plate 35 so as to establish a closed structure. This cross plate lies flat against the top surface of the roof member itself and may be secured thereto by rivets or bolts passed through the flanges aforesaid. Of course, the beams 29 and 30 will be curved to set snugly against the top of the roof.

When these beams are used they are preferably placed at advantageous points measured along the length of the roof, so as to distribute the stiffening action; and preferably also they are so placed as to bring their ends above selected ones of the side posts 10 and 11.

When these cross beams are used the center planks 25 will be stopped short at the sides of the cross beams as illustrated in Fig. 2, the cross planks being somewhat thinner than the depth of the cross beams. It will frequently be desirable to place diagonally extending ribs 36 on the roof so as to give a better footing to the passengers. When these ribs are used they will also preferably stop short of the cross beams so as not to raise the elevation at the positions of the cross beams.

In the modified construction shown in Fig. 5, there are provided stanchions 37 at the sides of the center aisle 17, and these stanchions directly support and reinforce the roof at points where they are located.

In the modified construction of Fig. 6, the stanchions 37 carry relatively thin longitudinally extending beams 38 which in turn support the roof, the beams serving to distribute the load to the stanchions.

In the modified construction of Fig. 7 the stanchions 37 are again provided. In this case, however, a bracket 39 reaches between the upper end of each stanchion and the corresponding side bracket 18 and serves to support the roof at a point immediately above. These brackets 39 when used may be centrally depressed, as shown at 40, and a longitudinally extending beam 41 may be supported within the depressed portions 40.

It may sometimes be desirable to use a stanchion or stanchions for providing additional support to the central portion of the roof. I have, therefore, illustrated in Fig. 1 a stanchion 42 at one side of the aisle 17 and close to the position of one of the seats 16. This stanchion reaches upwards from the floor to the roof 12 and gives direct support to the central portion of the roof.

It is also noted that the frame of the vehicle includes inwardly reaching brackets 43 which are secured to the side channel frame members 44. When stanchions such as 42 are used, the brackets 43 are preferably placed at such positions with respect to the stanchions that the loads of the stanchions are directly carried by said brackets.

Furthermore, when stanchions are used, it is preferred that they be placed in staggered relationship at the two sides of the aisle so as not to materially reduce the effective clearance of the aisle.

While I have herein shown and described only certain embodiments of the features of my present invention, still I do not intend to limit myself to the same, except as I may do so in the claims.

I claim:

1. In a double deck bus, the combination with the side walls having vertical posts between the windows and longitudinally extending beams connecting the upper ends of said posts, of a row of brackets at each side of the vehicle reaching inwardly and upwardly from the upper portions of the posts at that side to a position slightly above the position of the beam at the upper ends of such posts, a longitudinally extending beam supported by the brackets at each side of the vehicle, and a roof member arching over and completely enclosing the body of the vehicle between the first mentioned beams, said roof member comprising a multiple ply veneer board of substantially uniformly arching form having its edge portions resting upon and supported by the bracket beams and its extreme edges in engagement with the first mentioned beams, other longitudinally extending beams engaging the top face of the edge portions of the veneer board, transversely extending inverted channel beams on the top face of the roof having their ends above the positions of selected side wall posts, said transverse beams reinforcing the central portion of the structure, and a longitudinally extending planking on the central portion of the top of the roof reaching between the cross beams aforesaid.

2. In a double deck bus, the combination with the side walls having vertical posts between the windows and longitudinally extending beams connecting the upper ends of said ports, of a row of brackets at each side of the vehicle reaching inwardly and upwardly from the upper portions of the posts at that side to a position slightly above the position of the beam at the upper ends of such posts, a longitudinally extending beam supported by the brackets at each side of the vehicle, and a roof member arching over and completely enclosing the body of the vehicle between the first mentioned beams, said roof member comprising a multiple ply veneer board of substantially uniformly arching form having its edge portions resting upon and supported by the bracket beams and its extreme edges in engagement with the first mentioned beams, transversely extending inverted channel beams on the top face of the roof having their ends above the positions of selected wall posts, said transverse beams reinforcing the central portion of the structure, and a longitudinally extending planking on the central portion of the top of the roof reaching between the cross beams aforesaid.

3. In a double deck bus, the combination with the side walls having vertical posts between the windows and longitudinally extending beams connecting the upper ends of said posts, of a row of brackets at each side of the vehicle reaching inwardly and upwardly from the upper portions of the posts at that side to a position slightly above the position of the beam at the upper ends of such posts, a longitudinally extending beam supported by the brackets at each side of the vehicle, and a roof member arching over and completely enclosing the body of the vehicle between the first mentioned beams, said roof member comprising a multiple ply veneer board of substantially uniformly arching form having its edge portions resting upon and supported by the bracket beams and its extreme edges in engagement with the first mentioned beams, transversely extending inverted channel beams on the top face of the roof, said transverse beams reinforcing the central portion of the structure, and a longitudinally extending planking on the central portion of the top of the roof reaching between the cross beams aforesaid.

4. In a double deck bus, the combination with the side walls having vertical posts between the windows and longitudinally extending beams connecting the upper ends of said posts, of a row of brackets at each side of the vehicle reaching inwardly and upwardly from the upper portions of the posts at that side, a longitudinally extending beam supported by the brackets at each side of the vehicle, and a roof member arching over and completely enclosing the body of the vehicle between the first mentioned beams, said roof member comprising a multiple ply veneer board of substantially uniformly arching form having its edge portions resting upon and supported by the bracket beams and its extreme edges in engagement with the first mentioned beams, and transversely extending inverted channel beams on the top face of the roof, said transverse beams reinforcing the central portion of the structure.

5. In a double deck bus, the combination with the side walls having vertical posts between the windows and longitudinally extending beams connecting the upper ends of said posts, of a row of brackets at each side of the vehicle reaching inwardly and upwardly from the upper portions of the posts at that side, a longitudinally extending beam supported by the brackets at each side of the vehicle, and a roof member arching over and completely enclosing the body of the vehicle between the first mentioned beams, said roof member comprising a member of substantially uniformly arching form having its edge portions resting upon and supported by the bracket beams and its side edges in engagement with the first mentioned beams, and means for supporting the central portions of the roof member, the undersurface of the roof member being continuously free and clear of downwardly depending projections throughout substantially the full length of the central portion of the roof.

CHARLES O. BALL.